United States Patent [19]

Shaw

[11] 4,026,779
[45] May 31, 1977

[54] ELECTROLYTE FOR ELECTROCHEMICALLY MACHINING NICKEL BASE SUPERALLOYS

[75] Inventor: Richard Horace Shaw, Hampden, Mass.

[73] Assignee: United Technologies Corporation, Hartford, Conn.

[22] Filed: May 6, 1976

[21] Appl. No.: 684,054

[52] U.S. Cl. .......................................... 204/129.75
[51] Int. Cl.² .......................................... C25F 3/02
[58] Field of Search .................. 204/129.75, 129.80

[56] References Cited

UNITED STATES PATENTS

| 3,284,327 | 11/1966 | Maeda et al. | 204/129.75 |
| 3,401,103 | 9/1968 | Joyce | 204/129.75 |

FOREIGN PATENTS OR APPLICATIONS

| 2,124,935 | 11/1972 | Germany | 204/129.75 |
| 45-18771 | 6/1970 | Japan | 204/129.75 |
| 324,299 | 3/1972 | U.S.S.R. | 204/129.75 |
| 281,984 | 12/1970 | U.S.S.R. | 204/129.75 |

*Primary Examiner*—T. M. Tufariello
*Attorney, Agent, or Firm*—Edward J. Timmer

[57] ABSTRACT

An electrolyte useful in the electrochemical machining of nickel base superalloys, especially those containing hafnium, is disclosed. The electrolyte is an aqueous solution of inorganic chloride and nitrate salts in critical quantities. Nickel base superalloys electrochemically machined using the electrolyte of the invention possess smooth, defect-free machined surfaces.

3 Claims, No Drawings

ELECTROLYTE FOR ELECTROCHEMICALLY MACHINING NICKEL BASE SUPERALLOYS

BACKGROUND OF THE INVENTION

1. Field of the Invention

The present invention relates to electrolytes useful in the electrochemical machining of nickel-base superalloys, especially those containing hafnium.

2. Description of the Prior Art

Electrochemical machining is widely used in the gas turbine industry to produce parts, such as blades, vanes and the like, having aerodynamically contoured surfaces and internal cooling passages from materials, such as nickel base superalloys, which are difficult to machine by conventional techniques. Electrochemical machining involves the controlled removal of metal from a part by anodic dissolution in an electrolytic cell in which the part is the anode and the tool is the cathode. Electrolyte is pumped between the tool and part while a direct current is passed through the cell at a low voltage so as to dissolve metal from the part.

Electrolytes commonly used in the prior art to machine nickel base superalloys involve aqueous solutions of either inorganic salts or strong mineral acids. Typical of the former is an aqueous solution containing 1 pound per gallon of NaCl and 1 to 3 ounces per gallon of $NaNO_3$. Aqueous solutions containing NaCl and $NaNO_3$ are also used to electrochemically machine other metals and alloys, as illustrated in U.S. Pat. Nos. 3,284,327 and 3,401,103 and Russian Pat. Nos. 281,984 and 324,299.

Unfortunately, the prior art aqueous electrolyte solutions have not always produced satisfactory results in terms of providing a desirable surface finish on the machined nickel base superalloy part. Oftentimes, the machined surface exhibits pits, microcracks and other defects as a result of preferential anodic dissolution of certain phases or morphological features, such as grain boundaries, of the nickel base superalloy. Such surface defects are highly deleterious since they can cause premature failure of the part during service in the harsh environment of the gas turbine engine. Especially unsatisfactory results have been observed with nickel base superalloys containing hafnium, such as that known generally as MAR-M200+Hf comprising (nominally) 9% Cr, 10% Co, 2% Ti, 5% Al, 0.15% C, 12% W, 1% Cb, 2% Hf, 0.015% B, balance essentially nickel. Although the hafnium-bearing nickel base superalloys exhibit useful properties, their application in gas turbine engines has been somewhat limited due to the inability of the prior art to electrochemically machine the material with the desired defect-free surface.

One attempt to provide a smooth, defect free surface on nickel base superalloys, including those containing hafnium, is illustrated in copending U.S. application Ser. No. 638,209 entitled "Electrolyte for Electrochemical Machining of Nickel Base Superalloys" and assigned to the assignee of the present invention. The electrolyte disclosed therein comprises an aqueous solution of strong mineral acids, including nitric and hydrochloric acids, and citric acid.

SUMMARY OF THE INVENTION

The present invention provides an electrolyte useful in the electrochemical machining of nickel base superalloys. The electrolyte typically comprises an aqueous solution of inorganic chloride and nitrate salts, including chloride ions in the amount of at least about 0.5 pounds per gallon and nitrate ions in the amount of at least 1.0 pounds per gallon. The electrolyte produces essentially equal attack on all common phases found in nickel base superalloys. Uniform dissolution is optimized when the pH of the solution is from about 8 to about 12. Extremely satisfactory results are obtained with nickel base superalloys containing additions of hafnium when chloride ions are present in solution in the amount from about .6 to about 1.25 pounds per gallon and nitrate ions are present in the amount from about 1.25 to about 2.0 pounds per gallon, the pH of the solution being from about 8 to about 12.

These and other objects and advantages of the present invention will become apparent in light of the following detailed description of the preferred embodiment.

DESCRIPTION OF THE PREFERRED EMBODIMENT

The electrolyte of the present invention includes an aqueous solution of inorganic chloride and nitrate salts in critical quantities. It is essential to the success of the present invention that both chloride and nitrate ions be present in aqueous solution in the concentrations taught herein. If the concentrations of these ingredients are allowed to deviate from the established limits, the electrochemically machined surface on the nickel base superalloy part will exhibit objectionable defects, such an excessive intergrannular attack, selective phase dissolution manifested as holes or pits and the like.

It has been found that the chloride ion concentration in the aqueous solution must be at least about 0.5 pounds per gallon and that the nitrate ion concentration must be at least about 1.0 pounds per gallon, the upper concentration limits being dictated by the solubility of the respective inorganic salts in the aqueous solution. When present in these minimum concentrations, the chloride and nitrate ions cooperate to dissolve the common phases present in nickel base superalloys, such as gamma and gamma prime at a substantially equal rate when direct current is passed through the electrolytic cell. Optimum uniformity of metal dissolution has been observed when the pH of the solution is from about 8 to about 12.

In electrochemically machining nickel base superalloys containing hafnium, such as MAR-M200+Hf, a preferred electrolyte composition includes chloride ions in the amount from about 0.6 to about 1.25 pounds per gallon and nitrate ions in the amount from about 1.25 to about 2.0 pounds per gallon, the pH of the solution being from about 8 to about 12. Smooth, defect-free machined surfaces have been consistently provided on such alloys with the preferred electrolyte composition and an applied voltage of from about 10V to about 15V.

In the practice of the present invention, the chloride and nitrate ion concentrations are provided by dissolving a selected amount of the respective salts of sodium, potassium, calcium, magnesium, strontium, barium and the like in the solution. The chloride and nitrate salts of sodium and potassium are preferred since they have the least scale-forming tendency and therefore the least chance of polarizing the cathode during machining. The pH of the solution may be adjusted by introducing a suitable alkaline agent, such as NaOH, KOH and the like, therein until the desired pH value is obtained.

Having thus described my invention, the following example of the electrochemical machining of the leading edge of a gas turbine blade made from the nickel base superalloy generally known as MAR-M200+Hf (nominal composition being 9% Cr, 10% Co, 2% Ti, 5% Al, 0.15% C, 12% W, 1% Cb, 2% Hf, 0.015% B, balance essentially nickel) is offered to illustrate it in more detail.

EXAMPLE

The electrolyte composition used comprised an aqueous solution containing 1.75 pounds per gallon of sodium chloride and 2.5 pounds per gallon of sodium nitrate, the pH of the solution being 10. In the usual prior art fashion, a dam was provided around the blade below the leading edge so that the electrolyte could be circulated in a laminar manner over the edge. A voltage of about 12V to 13V was applied between the blade, the anode, and a copper alloy tool, the cathode, to effect electrochemical machining. During machining, the electrolyte pressure and temperature were 250 psi and 110° F, respectively. After the desired edge contour was obtained, the blade was removed from the electrolytic cell for inspection. The inspection indicated that the electrochemically machined surface of the leading edge was smooth and essentially defect-free. No selective attack was observed at grain boundaries, the phases present in the alloy, or other features.

Although the invention has been shown and described with respect to a preferred embodiment thereof, it should be understood by those skilled in the art that various changes may be made therein without departing from the spirit and scope of the invention.

Having thus described typical embodiments of the invention, that which I claim as new and desire to secure by Letters Patent of the United States is:

1. In electrochemically machining a part made of a nickel base superalloy having gamma and gamma prime phases present therein wherein the part is the anode and the tool is the cathode in an electrolytic cell, the improvement which comprises immersing the part in an aqueous solution of inorganic chloride and nitrate salts, including chloride ions in the amount of at least about 0.5 lbs/gal and nitrate ions in the amount of at least 1.0 lbs/gal, the solution providing essentially equal attack of the phases of said superalloy part when direct current is passed through the cell.

2. The method of claim 1 wherein the solution has a pH from about 8 to about 12.

3. In electrochemically machining a part made of a nickel base superalloy containing hafnium and having gamma and gamma prime phases present therein wherein the part is the anode and the tool is the cathode in an electrolytic cell, the improvement which comprises immersing the part in an aqueous solution of inorganic chloride and nitrate salts, including chloride ions in the amount from about 0.6 to about 1.25 lbs/gal and nitrate ions in the amount from about 1.25 to about 2.0 lbs/gal, the pH of the solution being from about 8 to about 12, the solution providing essentially equal attack of the phases of said superalloy part when direct current is passed through the cell.

* * * * *